(12) United States Patent
Wang et al.

(10) Patent No.: US 7,533,373 B2
(45) Date of Patent: May 12, 2009

(54) METHOD FOR PREVENTION OF SYSTEM EXECUTION MALFUNCTION

(75) Inventors: Ming Wang, Chunghe (TW); Chien-Fei Cheng, Hsintien (TW)

(73) Assignee: Taiwan Semiconductor Manufacturing Co., Ltd, Hsinchu (TW)

( * ) Notice: Subject to any disclaimer, the term of this patent is extended or adjusted under 35 U.S.C. 154(b) by 535 days.

(21) Appl. No.: 11/042,915

(22) Filed: Jan. 25, 2005

(65) Prior Publication Data

US 2006/0168570 A1 Jul. 27, 2006

(51) Int. Cl.
*G06F 9/45* (2006.01)
(52) U.S. Cl. ............... 717/140; 717/136; 717/137; 717/138; 717/139; 717/141; 717/142
(58) Field of Classification Search ......... 717/136–142
See application file for complete search history.

(56) References Cited

U.S. PATENT DOCUMENTS

| | | | |
|---|---|---|---|
| 5,860,072 A * | 1/1999 | Schofield | 707/101 |
| 6,182,277 B1 * | 1/2001 | DeGroot et al. | 717/115 |
| 6,634,020 B1 * | 10/2003 | Bates et al. | 717/130 |
| 6,728,788 B1 * | 4/2004 | Ainsworth et al. | 719/330 |
| 7,146,300 B2 * | 12/2006 | Zammit et al. | 717/126 |
| 2002/0059480 A1 * | 5/2002 | Matsuura | 710/1 |
| 2002/0147902 A1 * | 10/2002 | Kahn et al. | 712/244 |
| 2004/0093605 A1 * | 5/2004 | Alverson et al. | 719/310 |
| 2004/0098721 A1 * | 5/2004 | Alverson et al. | 718/102 |
| 2004/0107217 A1 * | 6/2004 | Hastings | 707/104.1 |

* cited by examiner

*Primary Examiner*—Wei Y Zhen
*Assistant Examiner*—Junchun Wu
(74) *Attorney, Agent, or Firm*—Thomas, Kayden, Horstemeyer & Risley

(57) ABSTRACT

A method for prevention of system execution malfunction is provided. First, an IDL (Interface Definition Language) file is compiled using an IDL compiler to generate a compiled IDL file. The compiled IDL file is converted by defining additional operations corresponding to a specific operator in the compiled IDL file. When a program comprising the converted file is executed with the specific operator, the additional operations are performed before original operations thereof.

14 Claims, 9 Drawing Sheets

METHOD FOR PREVENTION OF SYSTEM EXECUTION MALFUNCTION

BACKGROUND

The invention relates to system management, and particularly to methods for prevention of system execution malfunction.

In system management, it is critical to prevent execution malfunction. Since runtime errors may cause system shutdown, manufacturing systems, such as a MES (manufacturing execution system) require smooth and reliable execution environment, for production stability. Most 300 mm MESs, for example, adapt a CORBA (Common Object Request Broker Architecture). CORBA provides a dynamic container called Sequence as an array data structure for storing data. However, the structure is unstable since the system can shut down if a program accesses un-initialized memory on the system. It is difficult to block unsafe programs on MESs based on CORBA in a foundry.

IBM provides a fault tolerance mechanism for handling system execution malfunction. As shown in FIG. 1A, a system 100 provides three processes to serve corresponding programs simultaneously. In FIG. 1A, processes S1 and S2 are active to serve programs P1 and P2 respectively, and process P3 is idle. When process P2 causes the process P2 to shut down, the system automatically cancels process P2, wakes process P3 to re-serve process P2, and launches a new process P4 in idle status to handle new requests.

However, the IBM mechanism does not solve system shutdown problem by simply using another process to re-confront the program. For a complete solution, problematic codes have to be reviewed and revised line by line. This measure is inefficient and time-consuming, and errors can persist, thereby further jeopardizing the system.

Additionally, system shutdown problems also exist in network environments. The version of data transmitted from clients must match that recognized and accepted by a server. If the data version does not match, the system can shut down. FIG. 2 illustrates a mechanism to solve system shutdown problems in a network environment. For transmission from a server 220, a client 210 first transmits a data version to a version unit 221 of the server 220 (S1). The version unit 221 then determines whether the data version matches that used thereon, and returns an acknowledgement to the client 210 (S2). If the data version matches, the client 210 transmits data to a processing kernel 222 of the server 220 (S3). Otherwise, the client 210 cancels the transmission. This conventional mechanism, however, requires several network transmissions, making it also inefficient and time-consuming.

SUMMARY

According to an embodiment of the invention, a prevention method for system execution malfunctions is provided. First, an IDL (Interface Definition Language) file is compiled using an IDL compiler. Then, the compiled IDL file is converted by defining additional operations corresponding to a specific operator therein. When a program comprising the converted file is executed with the specific operator, the additional operations are performed before the original operations thereof.

A header file is further generated during compilation of the IDL file, and a source code file is compiled with the header file, using a source code compiler. The converted file and the compiled source code file are combined to generate the program.

The specific operation comprises a subscribe operator of CORBA. The additional operations comprise determining whether a parameter value of the subscribe operator is within an initialized value, allowing the original operations of the subscribe operator to be performed if the parameter value is within the initialized value, and canceling the execution of the original operations of the subscribe operator if the parameter value is not within the initialized value. The additional operations comprise determining whether the subscribe operator requires access of un-initialized memory, allowing the original operations of the subscribe operator to be performed if the subscribe operator does not require access of un-initialized memory, and canceling execution of the original operations of the subscribe operator if the subscribe operator requires access of un-initialized memory.

An error message is returned if the parameter value is not within the initialized value or the subscribe operator requires access of un-initialized memory.

The prevention method for use in a network environment is also provided. First, a packet is received via a network. The packet is encoded with a data version and data by an encoder in advance. Then, the packet is decoded by a decoder to obtain the data version and data. It is determined whether the received data version matches a predetermined version, and, if so, operations are performed according to the received data. Otherwise, the packet is discarded.

The above-mentioned method may take the form of program code embodied in a tangible media. When the program code is loaded into and executed by a machine, the machine can become an apparatus for practicing the disclosed methods.

BRIEF DESCRIPTION OF THE DRAWINGS

The aforementioned features and advantages will become apparent by referring to the following detailed description with reference to the accompanying drawings, wherein.

DESCRIPTION

In an embodiment of the invention, a conventional CORBA compiling procedure is modified to efficiently prevent system shutdown problems.

CORBA enables segments of programs, or objects, to communicate with one another regardless of their native programming language or operating system. CORBA provides a mechanism by which objects transparently communicate with other objects on different platforms in heterogeneous distributed environments. In this model, clients request services from objects through a well-defined interface. This interface is specified in IDL. A client accesses an object by issuing a request. The request, an event, carries information including an operation, the object reference of the service provider, and actual parameters.

Figure 1A:
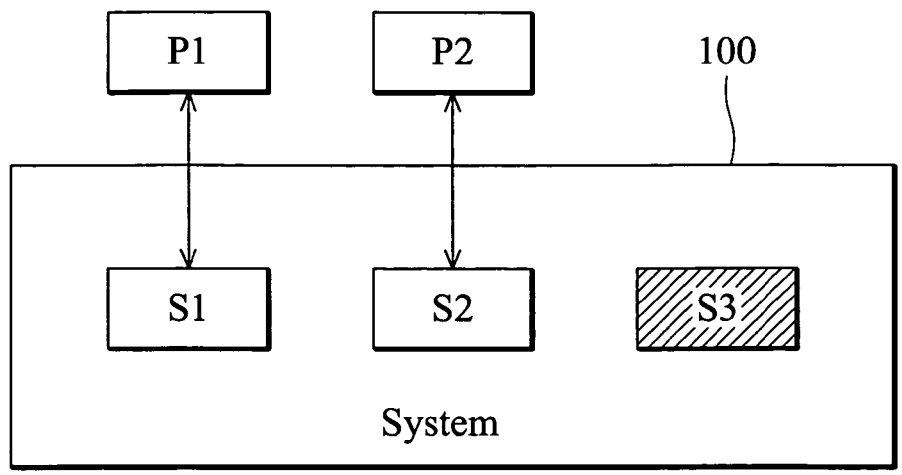
FIGS. 1A and 1B are schematic diagrams illustrating a conventional fault tolerance mechanism.
Figure 1B:
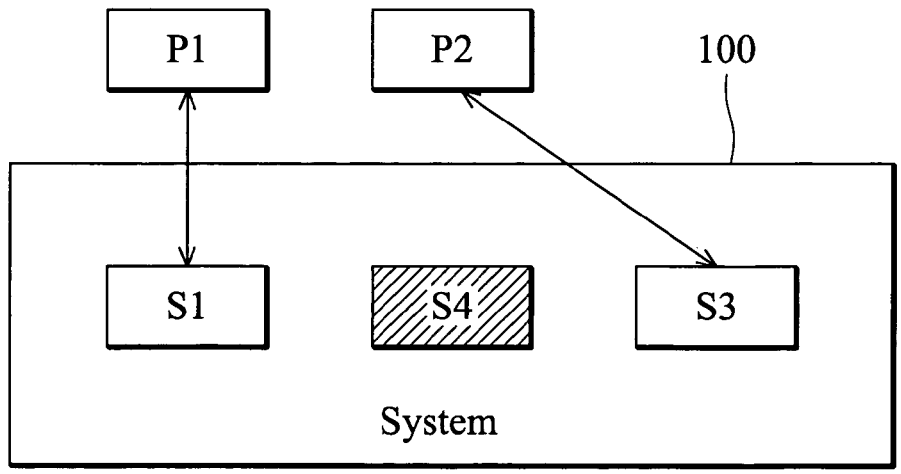
Figure 2:
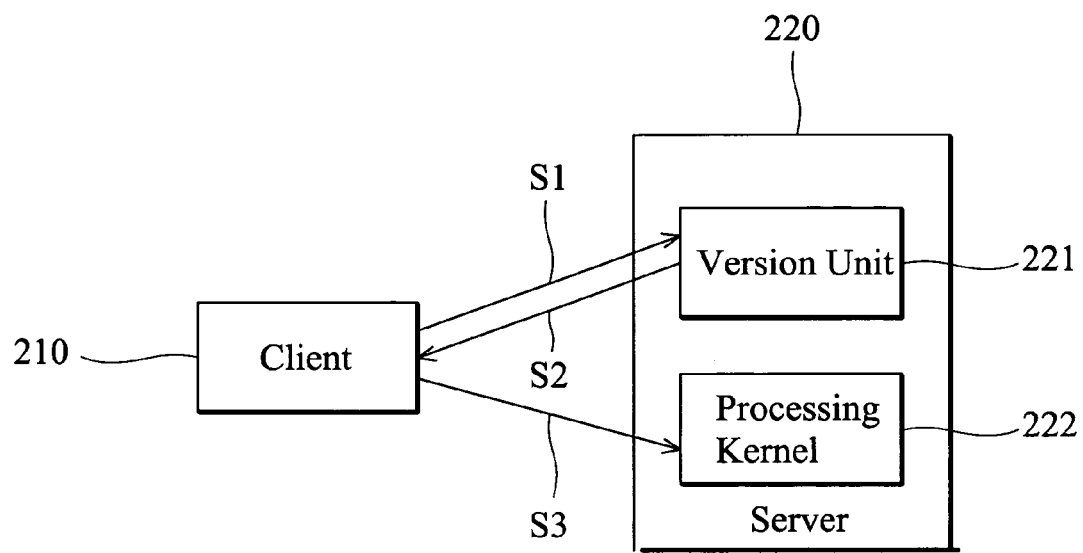
FIG. 2 illustrates a conventional mechanism for solving system shutdown problems in a network environment.
Figure 3:
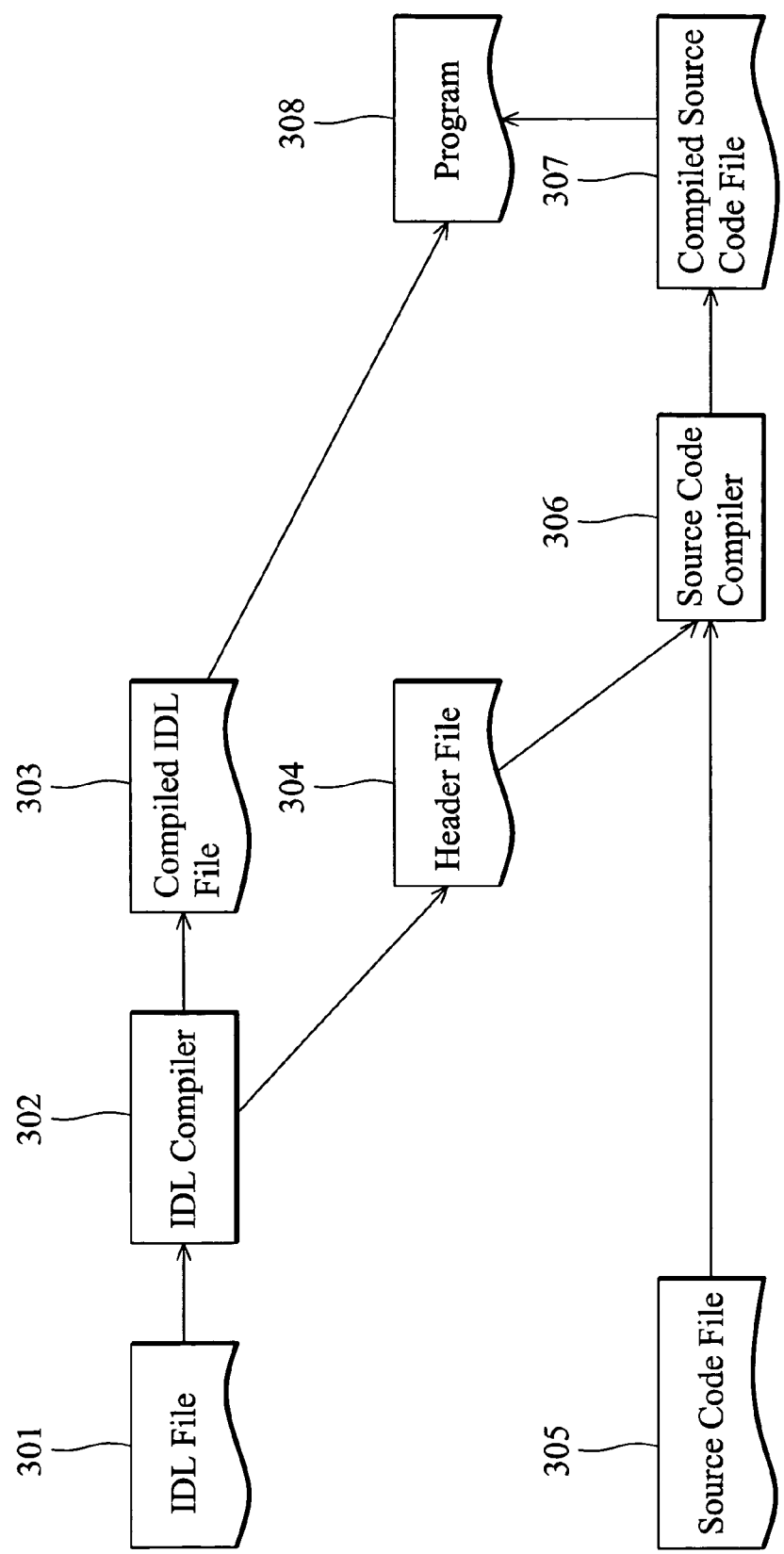
FIG. 3 is a schematic diagram illustrating a conventional CORBA compiling procedure.

FIG. 3 is a schematic diagram illustrating a conventional CORBA compiling procedure. As shown in FIG. 3, an IDL file 301, by an IDL compiler 302, generates a compiled IDL file 303 and a header file 304. It is understood that an IDL file contains one or more interface definitions. Each interface definition is composed of an interface header and an interface body. The interface header is demarcated by square brackets. The interface body is contained in parentheses.

Additionally, a source code file 305, with the header file 304, by way of a source code compiler 306, generates a compiled source code file 307. It is understood that the source code file 305 may be a file coded using C++, JAVA, or other programming language, and the source code compiler 306 may be CORBA-based C++, JAVA, or other compiler. The compiled IDL file 303 and source code file 307 are then combined to generate a program 308.

Figure 4:
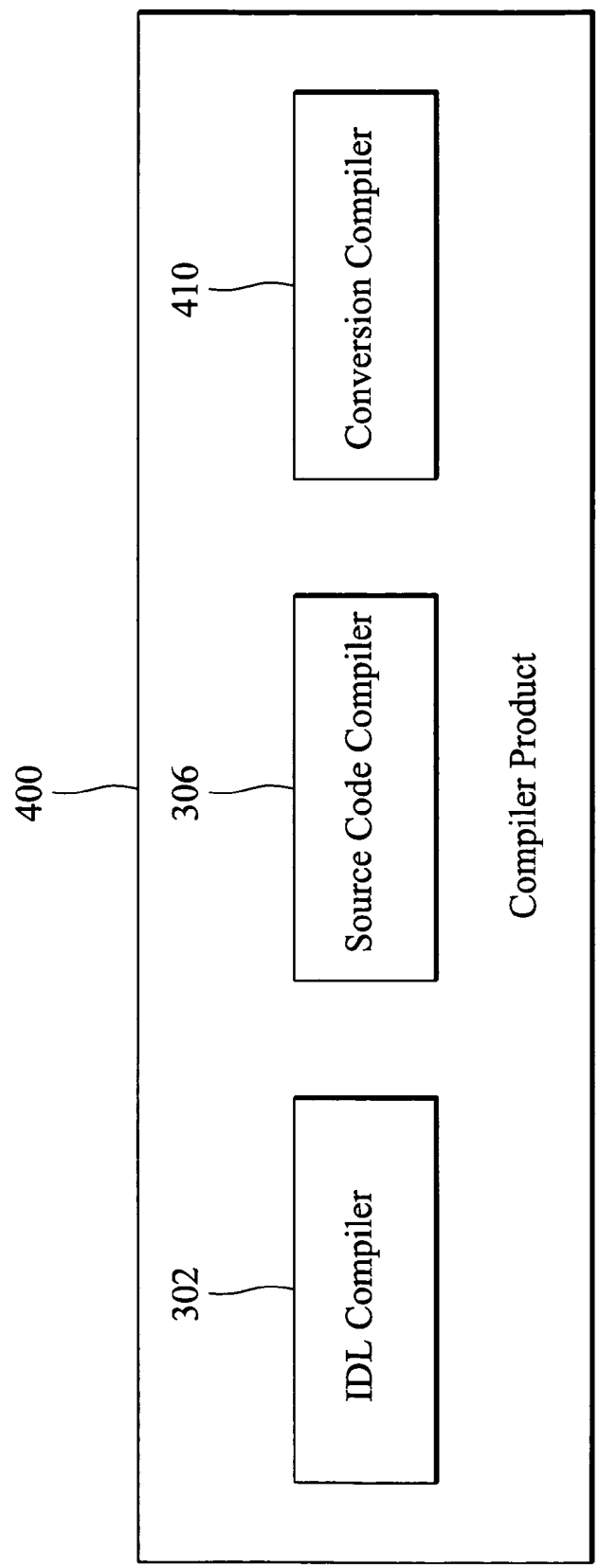
FIG. 4 is a schematic diagram illustrating a compiler product according to an embodiment of the invention.

FIG. 4 is a schematic diagram illustrating a compiler product according to an embodiment of the invention. The compiler product 400 comprises an IDL compiler 302, a source code compiler 306, and a conversion compiler 410. Detailed descriptions of the components follow.

Figure 5:
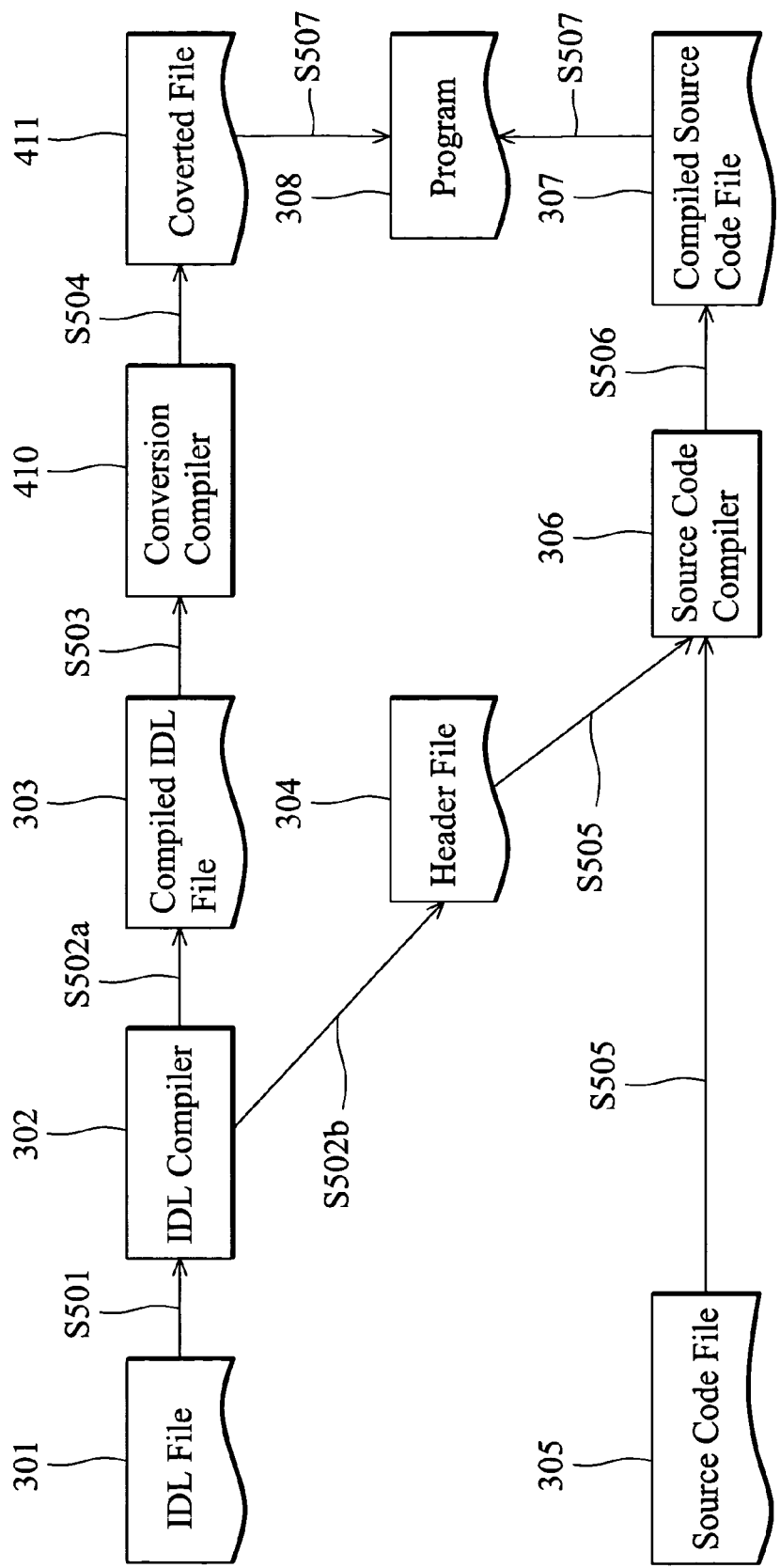
FIG. 5 is a schematic diagram illustrating a method for prevention of system execution malfunction according to an embodiment of the invention.

FIG. 5 is a schematic diagram illustrating a method for prevention of system execution malfunction according to an embodiment of the invention. Similar components in FIGS. 3, 4, and 5 are referred to using like designations. First, an IDL file 301 is compiled using the IDL compiler 302 (S501) to generate a compiled IDL file 303 and a header file 304 (S502a and A502b). Then, the compiled IDL file 303 is converted by the conversion compiler 410 by defining additional operations corresponding to a specific operator therein (S503), generating a converted file 411 (S504).

Additionally, a source code file 305 is compiled with the header file 304 by a source code compiler 306 (S505) to generate a compiled source code file 307 (S506). Then, the converted file 411 and the compiled source code file 307 are combined to generate a program 308. It is understood that when the program 308, comprising the converted file 411, is executed with the specific operator, the additional operations are performed before original operations thereof. The specific operation may comprise a subscribe operator of CORBA. The additional operations may be, but not limited to, protected operations comprising determining whether the subscribe operator requires access of un-initialized memory, determining whether a parameter value of the subscribe operator is within an initialized value. Original operations of the subscribe operator, well defined in CORBA are omitted here.

Figure 6:
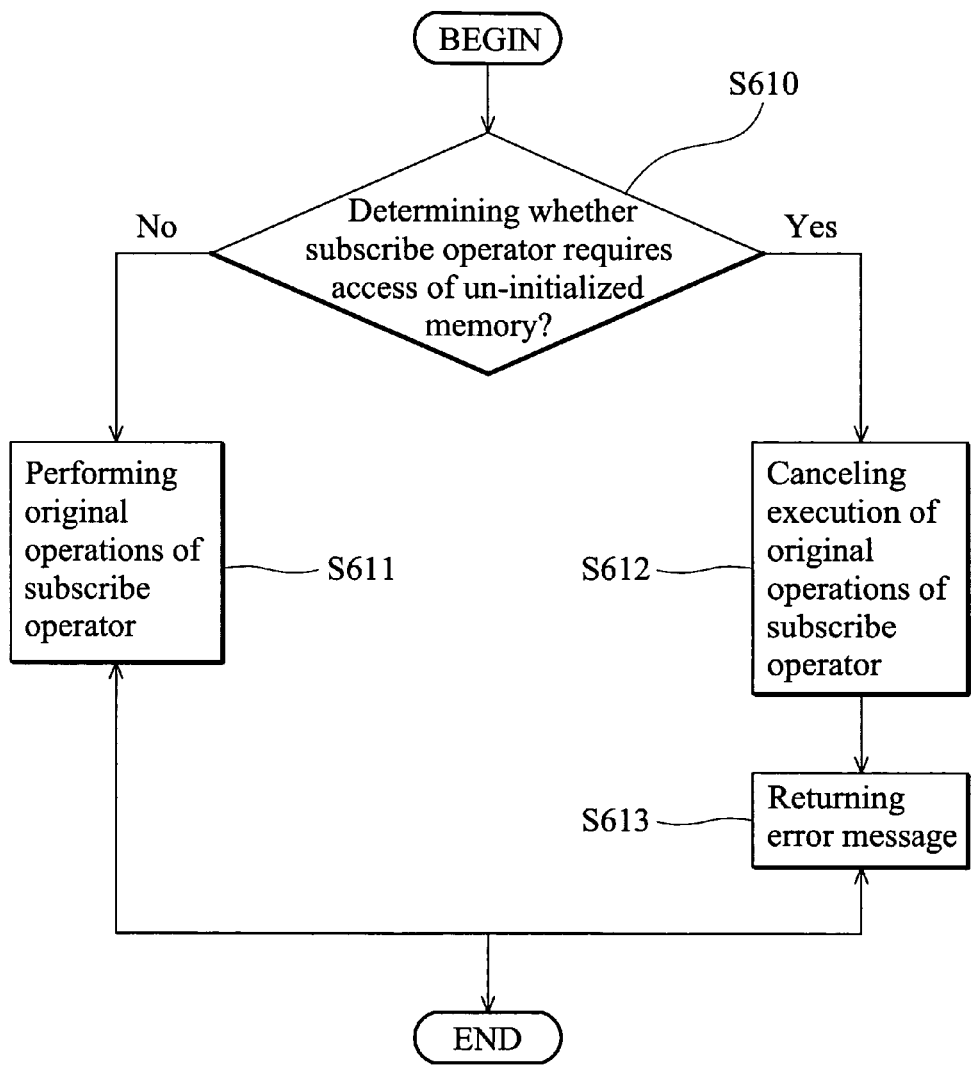
FIG. 6 is a flowchart showing the process of program execution according to an embodiment of the invention.

FIG. 6 is a flowchart showing the process of program execution according to an embodiment of the invention. When a program is executed with the subscribe operator, first, in step S601, it is determined whether the subscribe operator requires access of un-initialized memory. Similarly, it is determined whether a parameter value of the subscribe operator is within an initialized value. If not ("No" in step S610), in step S611, the original operations of the subscribe operator are allowed to take place according to corresponding parameters. If so ("Yes" in step S610), in step S612, execution of the original operations of the subscribe operator is canceled, and in step S613, an error message is returned to the computer system or related personnel for further action.

Figure 7:
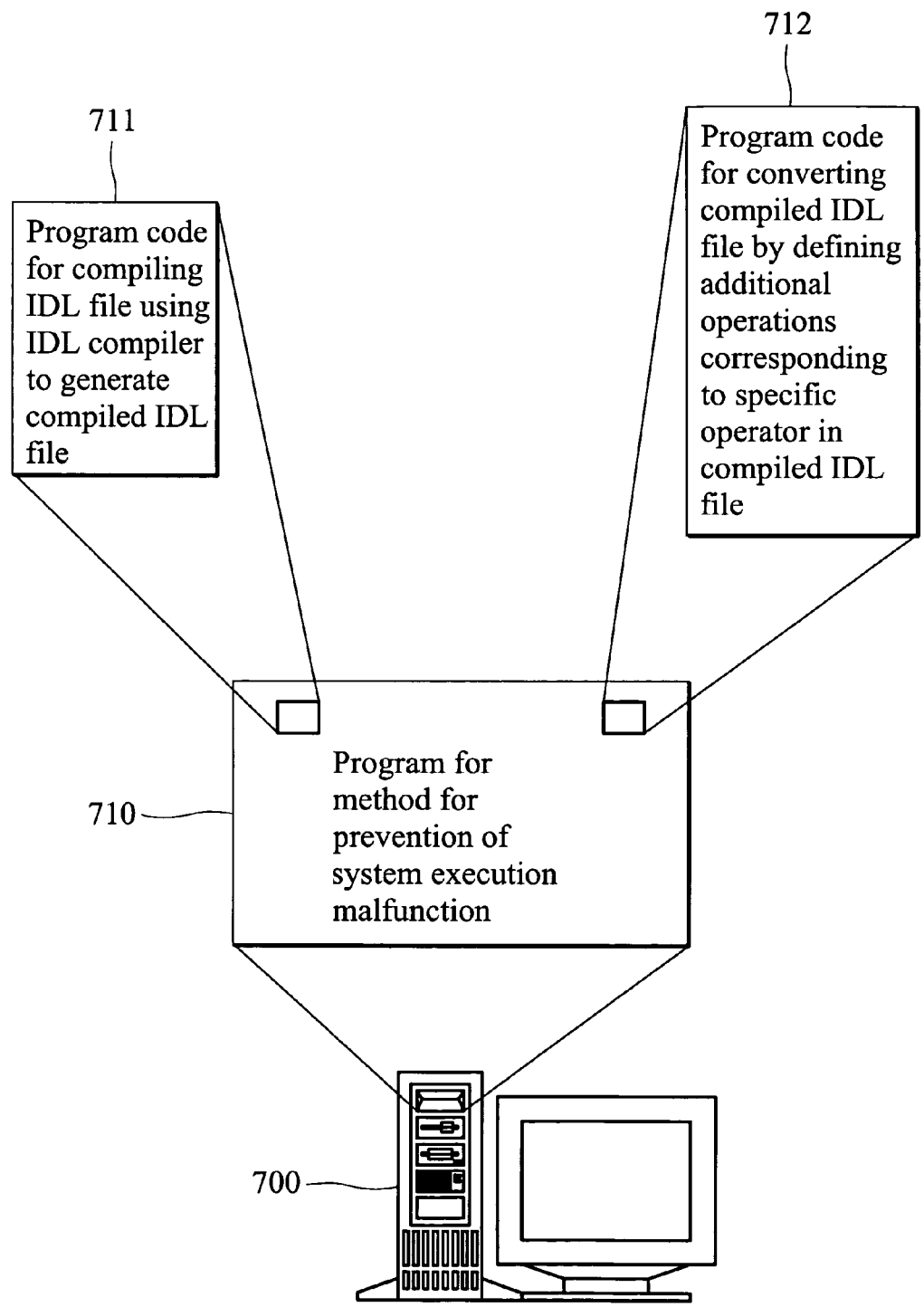
FIG. 7 is a schematic diagram illustrating a storage medium storing a computer program for execution of the method for prevention of system execution malfunction according to an embodiment of the invention.

FIG. 7 is a diagram of a storage medium storing a computer program providing the method for prevention of system execution malfunction according to an embodiment of the present invention. The computer program product comprises a storage medium 710 having computer readable program code embodied therein for use in a computer system 700. The computer readable program code comprises at least computer readable program code 711 compiling an IDL file using an IDL compiler to generate a compiled IDL file, and computer readable program code 712 converting the compiled IDL file by defining additional operations corresponding to a specific operator therein. When a program comprising the converted file is executed with the specific operator, the additional operations are performed before original operations thereof.

The program further comprises computer readable program code (not shown) determining whether the specific operator requires access of un-initialized memory, computer readable program code (not shown) allowing the original operations of the specific operator to be performed if the specific operator does not require access of un-initialized memory, and computer readable program code (not shown) canceling execution of the original operations of the specific operator if the specific operator requires access of un-initialized memory. The program further comprises computer readable program code (not shown) issuing and returning an error message if the specific operator requires access of un-initialized memory.

Figure 8:
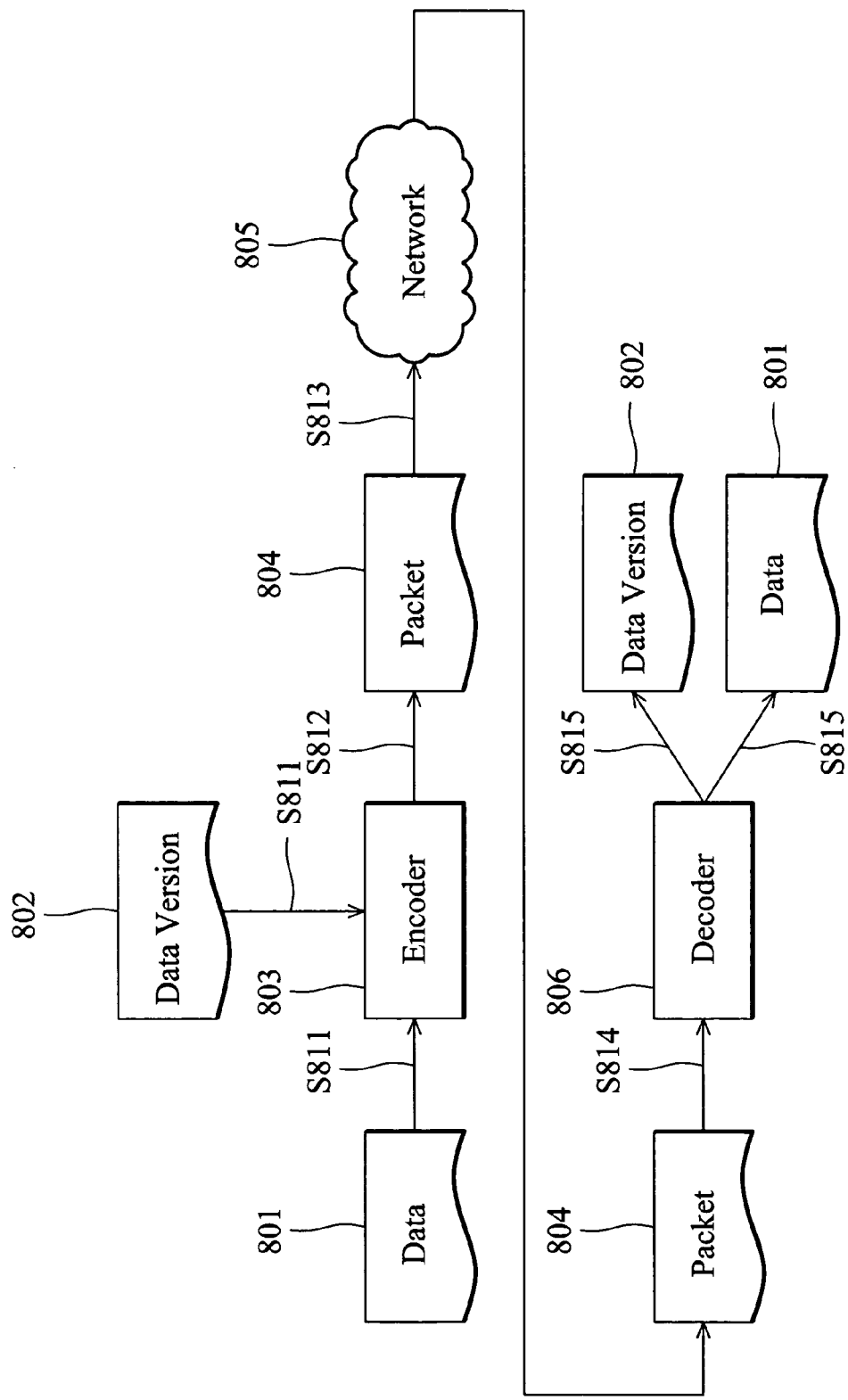
FIG. 8 is a schematic diagram illustrating a method for prevention of system execution malfunction in a network environment according to an embodiment of the invention.

FIG. 8 is a schematic diagram illustrating the architecture of a method for prevention of system execution malfunction in a network environment according to another embodiment of the invention. The environment comprises an encoder 803 and a decoder 806 on at least one client and a server respectively.

First, a data version (or format) 802 on the client and data 801 is encoded by the encoder 803 (S811) to generate a packet 804 (S812), and the packet 804 is transmitted to the server via a network 805 (S813). After receiving which, the packet 804 is decoded by the decoder 806 (S814) to obtain data version 802 and data 801 (S815). Then, it is determined whether the data version 802 matches a predetermined version on the server, and, if so, operations are performed accordingly.

Figure 9:
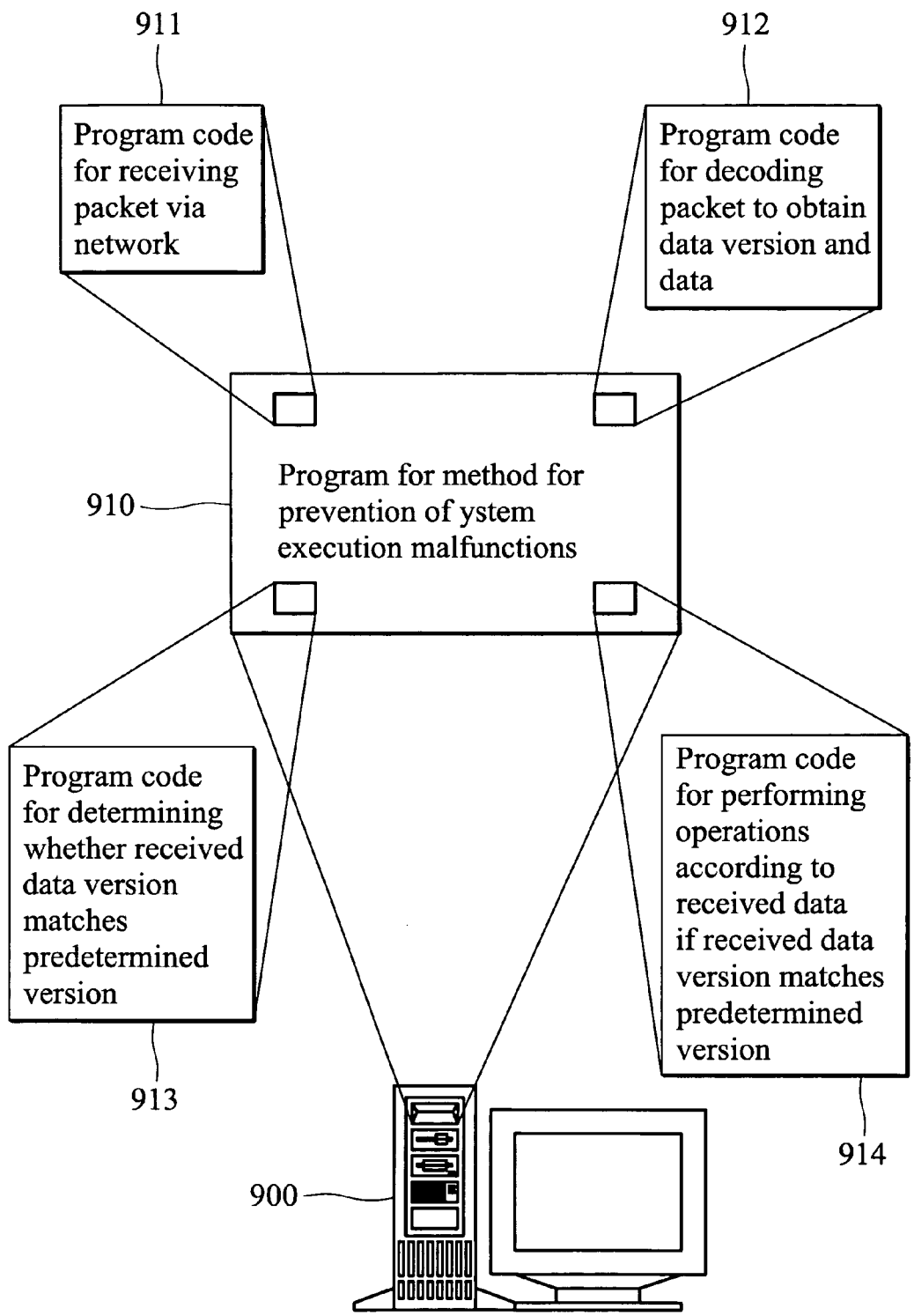
FIG. 9 is a schematic diagram illustrating a storage medium storing a computer program for execution of the method for prevention of system execution malfunction according to an embodiment of the invention.

FIG. 9 is a diagram of a storage medium storing a computer program providing the method for prevention of system execution malfunction according to an embodiment of the present invention. The computer program product comprises a storage medium 910 having computer readable program code embodied therein for use in a computer system 900. The computer readable program code comprises at least computer readable program code 911 receiving a packet via a network, computer readable program code 912 decoding the packet to obtain a data version and data, computer readable program code 913 determining whether the received data version matches a predetermined version, and computer readable program code 914 performing operations accordingly if the received data version matches the predetermined version.

Embodiments of the invention may thus provide efficient prevention of system execution malfunctions, saving related time and manpower, and enhancing reliability of the system.

Embodiments of the method and system, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the embodiment. Embodiments of the method and system may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the embodiments. When implemented on a general-purpose processor, the program code combines with the processor to provide a unique apparatus that operates analogously to application specific logic circuits.

Although the present invention has been described according to predefined embodiment, it is not intended to limit the invention thereto. Those skilled in this technology can still make various alterations and modifications without departing from the scope and spirit disclosed.

What is claimed is:

1. A method for prevention of system execution malfunction for use in a computer system, comprising:
    compiling an IDL (interface definition language) file to generate a compiled IDL file; and
    converting the compiled IDL file by defining additional operations corresponding to a specific operator in the compiled IDL file;
    wherein when a program comprising the converted file is executed with the specific operator, the additional operations are performed before original operations thereof, and when the additional operations are performed, the execution of the original operations of the specific operator is cancelled if a parameter value of the specific operator is not within a range of an initialized value, wherein the specific operator subscribes a specific service from an object, and the specific service is identified by the parameter value, or the execution of the original operations of the specific operator is cancelled if the specific operator requires access of un-initialized memory, wherein the access of the un-initialized memory comprises read and write.

2. The method of claim 1 further comprising:
    compiling the IDL file to further generate a header file;
    compiling a source code file with the header file using a source code compiler to generate a compiled source code file; and
    combining the converted file and the compiled source code file to generate the program.

3. The method of claim 1 wherein the specific operation comprises a subscribe operator of CORBA (Common Object Request Broker Architecture).

4. The method of claim 1 further comprising allowing the original operations of the specific operator to be performed if the parameter value is within the range of the initialized value.

5. The method of claim 4 further comprising returning an error message if the parameter value is not within the range of the initialized value.

6. The method of claim 1 further comprising allowing the original operations of the specific operator to be performed if the specific operator does not require access of un-initialized memory.

7. The method of claim 6 further comprising returning an error message if the specific operator requires access of un-initialized memory.

8. A tangible medium comprising a computer program, which, when executed, causes a device to perform a method for prevention of system execution malfunction, the method comprising:
    an IDL (interface definition language) compiler to compile an IDL file; and
    a conversion compiler to convert the compiled IDL file by defining additional operations corresponding to a specific operator in the compiled IDL file;
    wherein when a program comprising the converted file is executed with the specific operator, the additional operations are performed before original operations thereof, and when the additional operations are performed, the execution of the original operations of the specific operator is cancelled if a parameter value of the specific operator is not within a range of an initialized value, wherein the specific operator subscribes a specific service from an object, and the specific service is identified by the parameter value, or the execution of the original operations of the specific operator is cancelled if the specific operator requires access of un-initialized memory, wherein the access of the un-initialized memory comprises read and write.

9. The storage medium of claim 8 further comprising:
    a source code compiler to compile a source code file with a header file generated during the compilation of the IDL file;
    wherein the converted file and the compiled source code file are combined to generate the program.

10. The storage medium of claim 8 wherein the specific operation comprises a subscribe operator of CORBA (Common Object Request Broker Architecture).

11. The storage medium of claim 8 wherein the method further comprises allowing the original operations of the specific operator to be performed if the parameter value is within the range of the initialized value.

12. The storage medium of claim 11 wherein the additional operations further comprise returning an error message if the parameter value is not within the range of the initialized value.

13. The storage medium of claim 8 wherein the method further comprises allowing the original operations of the specific operator to be performed if the specific operator does not require access of un-initialized memory.

14. The storage medium of claim 13 wherein the additional operations further comprise returning an error message if the specific operator requires access of un-initialized memory.

* * * * *